G. W. SYLVESTER.
FILTER FOR PETROLEUM.
No. 60,593. Patented Dec. 18, 1866.
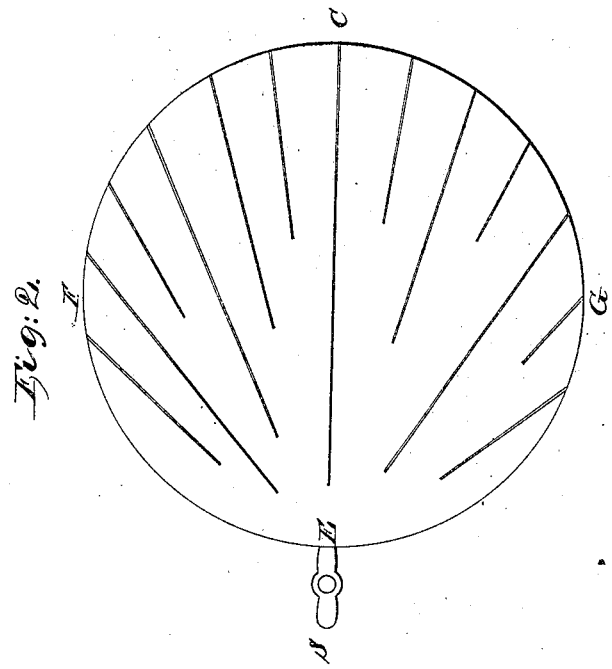
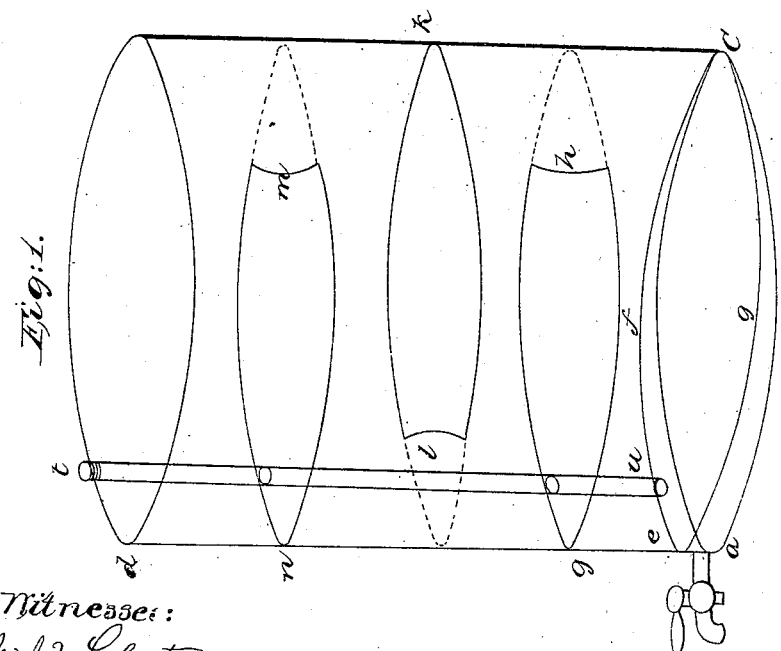

United States Patent Office.

IMPROVED FILTER FOR PETROLEUM.

GEORGE W. SYLVESTER, OF NEWARK, NEW JERSEY.

Letters Patent No. 60,593, dated December 18, 1866.

---

*The Schedule referred to in these Letters Patent and making part of the same.*

---

Be it known that I, GEORGE W. SYLVESTER, of the city of Newark, State of New Jersey, have invented an improved Filtering Apparatus for Petroleum.

Experience having proved that by simple percolation the oil passes so rapidly through the filtering material that it has no time to exert its full influence on the oil; the nature of my invention consists in keeping the oil for a sufficient length of time in contact with the filtering material, of compelling the crude oil to traverse back and forth through parallel diaphragms, and of assisting the whole operation by the introduction of heated air at the bottom of the filter.

I declare that the following is a full and exact description of my invention, which will enable others skillful in those matters to make and use it, reference being had to the accompanying drawing.

Figure 1. $a\ b\ c\ d$ represent a tank, the bottom of which is made to slightly incline towards the stop-cock, S, which is placed at its lowest point, the support on which the tank stands being made to conform to the inclination of the bottom of the tank, so that the tank may stand perpendicular. $n\ m$ and $l\ k$ and $g\ h$ are slightly inclined diaphragms, with holes at $m\ l$ and $h$, provided so as to compel the crude oil to pass horizontally, back and forth, through the filtering material. $e\ f\ b\ g$ is a perforated screen, lying parallel with a diaphragm, and supported by cross-pieces E F, E G, E C, as many as may be necessary, and radiating from the stop-cock S, as represented by Figure 2. The cross-pieces serve the purpose of supporting the screen with its superincumbent weight, and admit free passage of oil to the stop-cock S. The diaphragms and screen may be made to fit nicely the filter, and removable at pleasure for cleaning, or made permanently fast to the body of the filter. $u$ is a tube running to the bottom and opening beneath the screen for the purpose of permitting a current of hot air to be forced through the whole mass, from the bottom upward, as by this means the clarification, which is due to chemical action, is facilitated both by agitation and heat.

What I claim as my invention, and desire to secure by Letters Patent, is—

1. A petroleum-filter so arranged as to keep the crude oil in prolonged contact with the filtering material and to admit of the clarified oil being drawn off by a stop-cock or its equivalent, substantially as herein set forth.

2. Parallel diaphragms or their equivalent serving to lengthen the pathway of the descending oil, substantially as herein arranged and for the purposes set forth.

3. The introduction of a current of heated air into the bottom, so as to permeate and agitate the whole mass, and assist chemical action.

4. The perforated screen $e\ f\ b\ g$ with its radiating supports, used as in the manner described and for the purposes set forth.

In testimony whereof I have signed my name to this specification in the presence of two subscribing witnesses.

GEO. W. SYLVESTER.

Witnesses:
ISAIAH W. SYLVESTER,
JOSEPH BECSEY.